June 15, 1948.  J. C. HOBBS  2,443,187
PIPE COUPLING
Filed Aug. 15, 1944  2 Sheets-Sheet 1
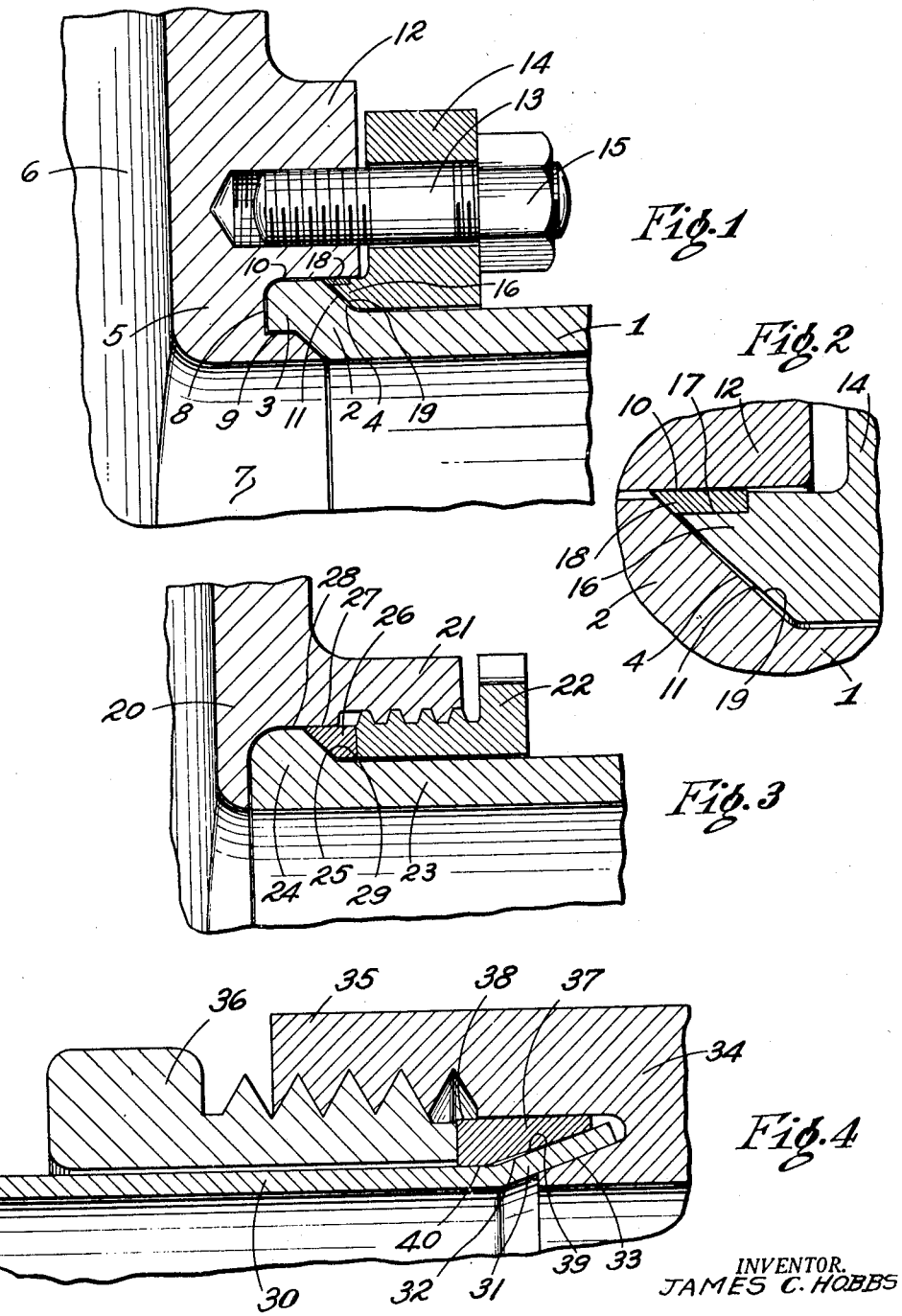
INVENTOR.
JAMES C. HOBBS
BY
Richey & Watts
ATTORNEYS

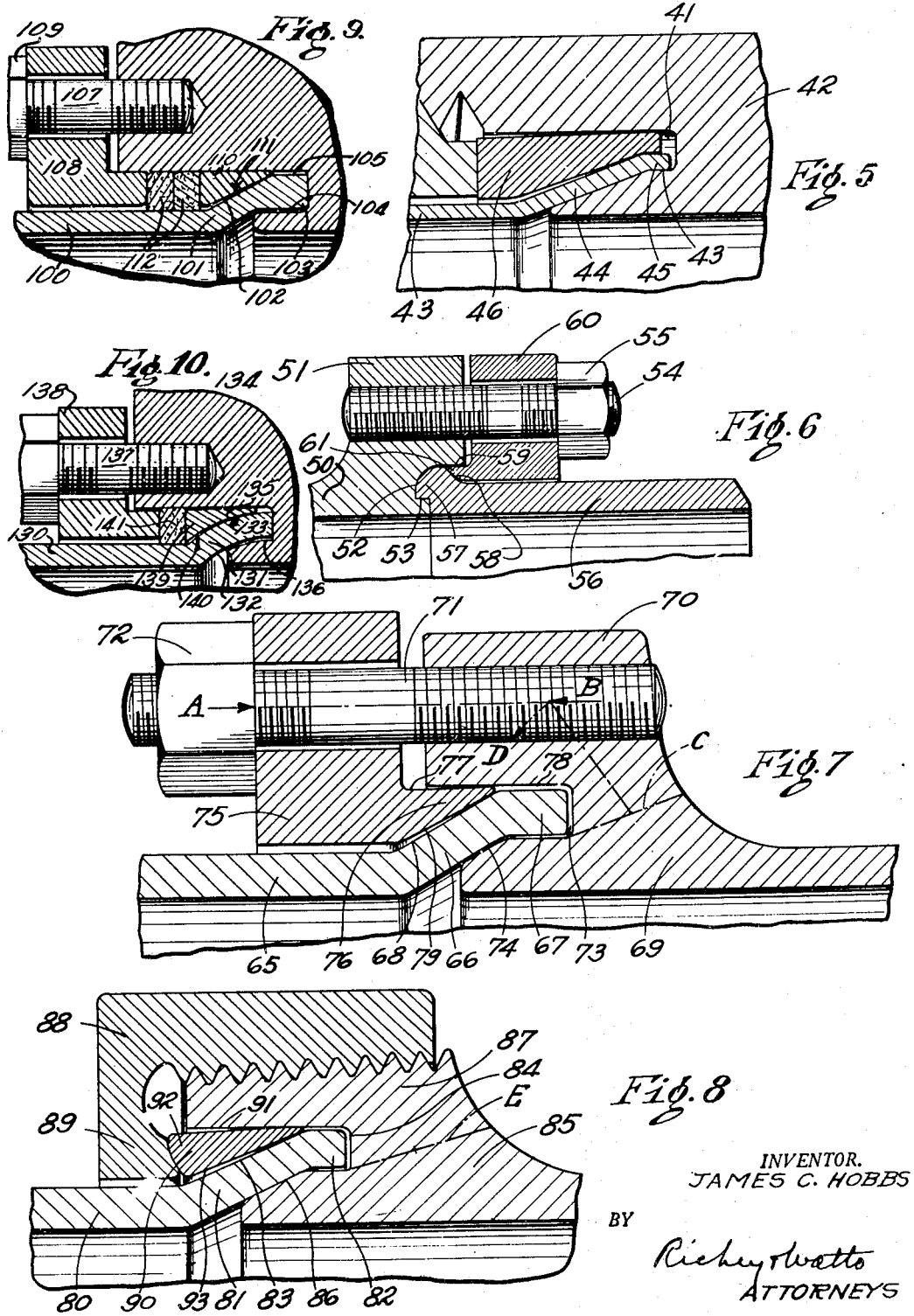

Patented June 15, 1948

2,443,187

UNITED STATES PATENT OFFICE

REISSUED 2,443,187

PIPE COUPLING

JUL 26 1949

James C. Hobbs, Painesville, Ohio

JUL 26 1949

Application August 15, 1944, Serial No. 549,533

5 Claims. (Cl. 285—86)

This invention relates generally to fluid seals and more particularly to new seals for the ends of pipes carrying fluids under high pressure.

A great many efforts have been made heretofore to prevent the escape of fluids at the ends of pipes, as in pipe couplings, joints and the like. Some of the seals proposed were fairly satisfactory in sealing against escape of low pressure fluids while other seals were fairly satisfactory in sealing thick walled pipes against escape of fluid under fairly high pressure. Most of the prior high pressure seals were heavy, cumbersome and expensive, and few, if any, of them were capable of sealing fluid pressures on the order of 1500 pounds per square inch or more when subject to rapid temperature changes.

The present invention provides a simple, light, inexpensive seal which is capable of sealing against escape of fluids whose pressures range all the way up to 10,000 pounds per square inch or more. Such seals may be used with pipes whose thicknesses range from a very thin wall such, for example, as 0.02 inch up to heavy walls such, for example, as several inches. Furthermore, the sealing effect of seals embodying the present invention increases with increases in forces tending to separate the pipe axially from its associated member and also increases with increases in the sealing force applied to the seal. From what has just been stated it will be apparent that the present invention provides a new seal which is capable of many different applications and which is not only better in many respects than prior seals but is much more effective in operation. Furthermore, as will be pointed out more in detail hereinafter, the mode of operation of seals embodying the present invention is new and different from the modes of operation of all other prior seals with which I am familiar.

In the drawings accompanying and forming a part of this specification and showing various forms of apparatus embodying this invention, Figure 1 is a fragmentary, sectional view showing a seal at the junction of a pipe end and a hollow member extending transversely to the longitudinal axis of the pipe;

Figure 2 is an enlarged view of parts of Fig. 1;

Figure 3 is a fragmentary, sectional view similar to Fig. 1, but showing a modified form of seal;

Figure 4 is a fragmentary, cross-sectional view of a seal between a pipe end and an aligned coupling;

Figure 5 is a view similar to Fig. 4 but showing a modified form of pipe end and sealing ring;

Figure 6 is a fragmentary, cross-sectional view of a seal at the telescoped ends of two pipes, one of which is flanged;

Figure 7 is a fragmentary, cross-sectional view of a seal at the junction of a flanged coupling and a pipe end and illustrating the application of forces to the seal and the effect of those forces on the sealing action of the device;

Figure 8 is a fragmentary, cross-sectional view resembling Fig. 7 in certain respects but illustrating the resolution of sealing forces by the threads on the flanged coupling;

Figure 9 is a view similar to Fig. 7 but showing deformable packing in conjunction with the sealing ring;

Figure 10 is a view similar to Fig. 9 but showing a modified pipe end and sealing ring with deformable packing.

In Figs. 1 and 2 the pipe 1 has an outwardly flared portion 2 near one end and a concentric lip 3. The outer surface 4 of portion 2 is conical with the base of the cone being nearer the end of the pipe. The conical surface 4 is inclined at an angle of approximately 45 degrees to the longitudinal center line of the pipe.

The member 5 extends transversely to pipe 1 and has a longitudinal passage 6 and a side passage 7. The face of member 5 opposed to pipe 1 is provided with an annular groove 8 around passage 7 and defined in part by radially spaced inner and outer surfaces 9 and 10. The lip 3 of pipe 1 extends into this groove 8 and may be supported on the inner surface 9 against forces applied to the exterior of pipe 1 by the sealing ring. Surface 10 is extended outwardly to surround the conical surface 4 on pipe 1 and to define therewith an annular space 11 which is triangular in cross-section.

The annular pad 12, constituting part of member 5, is provided with a plurality of threaded openings to receive studs 13. Retaining and sealing ring 14 is provided with a corresponding number of openings to receive studs 13 and may be urged toward member 5 by nuts 15 on the studs.

Ring 14 is provided with an annular flange 16 which has a substantially cylindrical outer surface and an annular depression 17 near its free end. A sealing ring 18, which may be composed of softer metal than that of the pipe 1 or member 5, is disposed in depression 17 and secured to flange 16. The end surfaces of ring 18 and flange 16 form a conical surface 19 which is inclined at an angle of approximately 44 degrees to the longitudinal center line of pipe 1. The base of the conical surface 19 is at or near the thin edge of flange 16 and is engageable with the conical surface 4 near its base.

When the pipe 1, member 5 and ring 18 are assembled substantially as shown in Figs. 1 and 2, and the nuts 15 are turned on studs 13 so as to force flange 16 into the annular space between surface 10 of member 5 and conical surface 4 of pipe 1, the flange 16 will be deflected outwardly so that the outer surface of the ring 18 will make substantially a line contact with surface 10 and the conical surface 19. It will also make substantially a line contact with conical surface 4. These two lines will lie in substantially the same plane transverse to the pipe 1. These line contacts constitute effective seals against escape of fluid under pressure between those surfaces. The angularity of annular space 11 which is defined by surfaces 4 and 19 is the difference between the 45 degrees of surface 4 and the 44 degrees of surface 19, or approximately one degree. One important advantage of a small space of approximately one degree is that the sealing contacts may be narrow and, therefore, fluid-tight and that they may increase in width under increasing pressure, but as the pressure increases the deflection of the sealing member is resisted more and more strongly and over wider and wider areas until the conical surface of that member may make contact for substantially its full axial length with the opposed conical surface. However, this is an extreme and exceptional condition.

While pipe 1 is shown as having a wall of substantial thickness, it will be understood that the pipe wall may be much thinner than that illustrated, for the support afforded by surface 9 of groove 8 will strongly resist any tendency of the pipe end to deform under pressure applied thereto by ring 14.

In Fig. 3 member 20 corresponds generally to member 5 of Fig. 1 but has an annular thread carrying flange 21 and a retaining ring 22 having threaded engagement in flange 21. The pipe 23 has a thickened end 24 and a conical surface 25 inclined at an angle of approximately 45 degrees to the center line of pipe 23 and with the base of that surface being nearer to the end of the pipe. The seal ring 26 has an outer surface 27 to engage the opposed cylindrical surface 28 in member 20, abuts at its thick end against threaded ring 22 and has a conical surface 29 extending from its thin end toward the thick end at an angle of approximately 44 degrees to the center line of pipe 23.

The sealing action of the apparatus of Fig. 3 is substantially like that of the apparatus of Figs. 1 and 2.

In Fig. 4 the pipe 30 has a flared end 31 whose outer surface 32 is conical and is inclined at an angle of about 20 degrees to the longitudinal center line of the pipe, with the base of the conical surface being nearer to the open end of the pipe and whose inner surface rests on the inner inclined surface 33 of coupling 34. That coupling has an annular flange portion 35 threaded interiorly to engage with an exteriorly threaded retaining ring 36 which abuts against the thick end of seal ring 37. The latter ring has an outer substantially cylindrical surface 38 and an inner conical surface 39 whose base is located near the thin end of the ring and whose inclination is approximately 18 degrees to the longitudinal center line of pipe 30. At its thick end ring 37 has a substantially cylindrical surface 40 whose diameter is only slightly greater than the outside diameter of pipe 30.

When the parts are assembled as shown in Fig. 4 and ring 36 is rotated to urge seal ring 37 toward the right, the inner surface 39 of ring 37 makes substantially a line contact with the opposed conical surface 39 of pipe 30 and the ring is deflected into substantially a line contact of its outer surface 38 with the opposed surface of the coupling. These two substantially line contacts are approximately in a plane at right angles to the longitudinal center line of pipe 30 and afford good seals to prevent escape of fluid under pressure from the interior of pipe 30 and past ring 37. The surface 33 of coupling 34 affords internal support adequate to prevent the crushing or distortion of the pipe end even when the pipe has a very thin wall and when the pressure exerted thereon by ring 37 is heavy.

The apparatus of Fig. 5 closely resembles that of Fig. 4. The major differences are that the annular groove 41 in coupling 42 has an inner wall 43 near its bottom which is substantially cylindrical; the flared end 44 of pipe 48 has a cylindrical lip 45 to seat on surface 43; and the seal ring 46 is a little larger in inside diameter than the outside diameter of pipe 48, so that normally there is no engagement of the thicker end of ring 46 with the outer surface of the pipe.

The seal ring 46, when pressure is exerted thereon by the retaining ring, makes substantially line contacts on its outer and inner surfaces with the coupling 42 and the conical surface of the flared portion 44 of pipe 48, and these lines of contact are located in substantially the same plane transverse to the longitudinal center line of the pipe.

In Fig. 6 the end of pipe 50 is flanged, as at 51, and is provided with an annular recess 52 having a substantially cylindrical inner side surface 53. The flange 51 is provided with threaded openings to receive studs 54 carrying nuts 55. The end of pipe 56 has a lip 57 to enter groove 52 and a substantially cylindrical surface to engage with surface 53. The outer surface 58 of lip 57 is substantially conical and is inclined at an angle of approximately 45 degrees to the longitudinal center line of pipe 56, and when the lip is in the assembled position shown in this figure this conical surface is opposed to a substantially cylindrical surface 59 of flange 51, and, together therewith, partly defines an annular space substantially triangular in cross-section.

Retainer ring 60 has a plurality of openings thru which studs 54 pass and is provided with a seal flange 61 which is generally triangular in cross-section and which may extend into the annular triangular space between surfaces 58 and 59. The surface 62 of flange 61 opposed to surface 58 and pipe 56 is conical, is inclined at an angle of about 44 degrees to the longitudinal center line of pipe 56, the bases of conical surfaces 58 and 62 being disposed in substantially the same plane transverse to the longitudinal center line of the pipe 56.

When the nuts 55 are turned on studs 54 to urge ring 60 toward flange 51, the conical surfaces 58 and 62 make a substantially line contact and a similar contact is made between the outer surface of seal flange 61 and the inner surface 59 of flange 51, thereby forming line contacts in substantially the same transverse plane which effectively seal the joint between pipes 50 and 56 against escape of fluid under pressure between their ends. It will be understood that, as has been mentioned in connection with previously described figures, the wall thickness of pipes 50 and 56 may be other than the thickness shown but these walls should be sufficiently thick to carry flanges 51 without breakage when the sealing forces are applied.

In Fig. 7 the pipe 65 has a flared end portion 66 and a substantially cylindrical lip 67. The outer surface 68 of the flared portion 66 is conical, is inclined at an angle of about 45 degrees to the longitudinal center line of the pipe and its base is near the lip portion 67. The coupling 69 has a flange 70 threaded to receive studs 71 which carry nuts 72. The coupling is provided with an annular groove 73 to receive the lip 67 and part of the flared portion 66 of pipe 65. The inner surface 74 of this groove 73 is inclined to engage the inner surface of flared portion 66 of pipe 65.

The retaining and sealing ring 75 is quite like ring 14 of Fig. 1 and 60 of Fig. 6. It has a sealing flange 76 with an outer surface 77 to engage surface 78 of groove 73 in coupling 69 and an inner conical surface 79 which is inclined at an angle of approximately 44 degrees to the longitudinal center line of pipe 65.

When the ring 75 is urged into groove 73 the flange 76, near its thin end, makes substantially line contacts with surfaces 78 and 68 and thereby effectively seals against escape of fluid under pressure thru groove 73.

It will be noted that outer surface 77 of flange 76 is slightly conical and that the flange 76 may be deformed radially inward to a small extent before the surface 78 of groove 73 will engage surface 77 of flange 76 for the full overlapping axial lengths of those surfaces. When nuts 72 urge ring 75 toward flange 70 force is exerted in the direction of arrow A, and force is exerted on the flange as indicated by arrow B. Since the groove 73 is fairly deep, the tendency of these forces is to bend or deform the flange substantially on line C with coincident movement of flange 70 along the line generally indicated by arrow D. Any tendency of flange 70 to bend along line C and move in the direction of arrow D, will result in greater pressure being exerted by the flange 70 on flange 76 of ring 75, and by the latter flange on conical surface 68 of flared portion 66 of pipe 65. Thus, as the sealing producing force exerted on ring 75 increases beyond the amount necessary to cause deflection of flange 70, the sealing action increases. Furthermore, this sealing action also increases when forces are applied to pipes 65 and 69 in a direction tending to separate them axially from one another.

In Fig. 8 the pipe 80 has a flared portion 81 and a lip portion 82. The outer surface 83 of flared portion 81 is conical, is inclined at an angle of about 45 degrees to the longitudinal center line of pipe 80 and its base is near the lip portion 82. The lip portion 82 and part of the flared portion 81 of pipe 80 extend into an annular groove 84 in pipe 85, part 86 of the inner surface of this groove bearing against the inner surface of the flared portion 81 of tube 80. Pipe 85 has an exteriorly threaded flange portion 87 to receive an interiorly threaded ring 88 which has an inwardly projecting flange 89 to abut against the thick end of seal ring 90 which projects into the annular space between surface 91 of groove 84 and conical surface 83 of flared portion 81 of pipe 80. The outer and inner surfaces 92 and 93 of ring 90 are conical, their bases being near the thin end of the ring and the inclination of these surfaces being such that annular angular spaces of approximately one degree were formed on either side of the ring with the opposed surfaces of flange 87 and flared portion 81 of pipe 80. When ring 88 is turned to urge ring 90 into groove 84 substantially line contacts are made between the outer and inner surfaces of ring 90 with the opposed surfaces 91 and 83 and the joint is effectively sealed against escape of fluid under pressure between the pipe ends. As has just been described in connection with the apparatus of Fig. 7, pressure exerted by ring 88 on seal ring 90 may deform flange 87 substantially along line E. The righthand sides of the threads on flange 87 are disposed substantially at right angles to the direction of movement of the flange when it is deflected about line E. By reason of this arrangement of threads sealing forces tending to deform flange 87 result in increased sealing effect between ring 90 and flange 87 and pipe 80; and the same result occurs when forces are applied to the pipes tending to separate them axially from one another.

In Fig. 9 pipe 100 has a flared end 101 having a conical outer surface 102 and a lip portion 13 having substantially cylindrical outer and inner surfaces 104 and 105. The coupling 106 has an axially extending groove with cylindrical side walls to receive the lip portion 103 and to support it internally by engaging with surface 104 of the latter. Conical surface 102 of pipe 100 is inclined at an angle of about 45 degrees to the longitudinal axis of the pipe while surface 111 is inclined at 43 degrees. Coupling 106 carries a plurality of studs 107 similar to those shown in Figures 1 and 6 and a retaining ring 108 is mounted on those studs for movement toward the coupling 106 by actuation of nuts 109 on studs 107.

A sealing ring 110 is positioned between the conical surface 102 of pipe 100 and the opposed cylindrical surface of coupling 106. The inner surface 111 of ring 110 is conical and inclined at an angle of about two degrees to the surface 102, the bases of conical surfaces 102 and 111 being engageable on a circumferentially continuous line near the thin edge of ring 111. Between the sealing ring 110 and retaining ring 108 two deformable packing rings 112 are disposed.

When the pipe and coupling are assembled as shown in this figure and retaining ring 108 is pressed against the adjacent packing 112 the two packings 112 are pressed together and against the adjacent end of the sealing ring 110 with the result that conical surface 111, engages the conical surface 102 and is deflected outwardly into contact with the opposed cylindrical surface of coupling 106. The result of this action is the establishment of two substantially line contacts between the outer and inner surfaces of ring 110 near its thin edge with the coupling and with the pipe. Pressure applied by ring 108 to packings 112 deforms them radially outwardly and inwardly into sealing contact with the outer surface of pipe 110 and the opposed cylindrical surface of coupling 106. In other words, pressure applied axially by ring 108 is transmitted through the packings and against the ring 110 and the same force acts to deform the fluid like packings 112 radially against the pipe and coupling.

In Fig. 10 pipe 130 has an end portion 131 which is flared outwardly and has inner and outer curved surfaces 132 and 133 which are substantially conical. Coupling 134 has an inner surface 135 which is substantially cylindrical and an opposed surface 136 which may be slightly curved as shown. The flared end 131 of pipe 130 projects into the space between surfaces 135 and 136. Coupling 134 is provided with studs 137 and a retaining ring 138 thereon, both quite like the studs and rings in Fig. 9. Sealing ring 139 has a substantially cylindrical outer surface and a curved but substantially conical inner surface 140. The radius of curvature of surface 140 is slightly greater than that of surface 133 so that an angular space of approximately 1 or 2 degrees exists between ring 139 and portion 131 of the pipe when the two are in assembled position under light pressure. Packing 141 is disposed between the retaining ring 138 and sealing ring 139 and resembles in material and operation the packings 112 and 126 of Fig. 9.

When ring 138 exerts pressure on packing 141 sealing ring 139 is pressed into contact near its thin edge with surface 133 of pipe 130 and is also deflected outwardly into contact with surface 135 of coupling 134. These two contacts are circumferentially continuous, substantially line contacts and are located approximately in a plane extending transversely of the longitudinal center line of pipe 130.

It will be understood that the flange portion 16 of ring 14 of Figs. 1 and 2 need not be cut away to receive ring 18 but that on the contrary ring 14 of those figures may be substantially like ring 75 of Fig. 7. Correspondingly it will be understood that ring 60 of Fig. 6 or ring 75 of Fig. 7 may be cut away and provided with a ring of different material as is illustrated by ring 18 in Figs. 1 and 2. Indeed the sealing rings of Figs. 3, 4, 5, 8 and 9 may similarly be provided with harder metal portions. Also it will be understood that retainer rings of the screw threaded type may be substituted for those of the stud carried type and vice versa and that retainer rings of forms other than those here illustrated may also be used when desired.

It will also be understood that the angularity of the conical surfaces in each of the foregoing embodiments of the invention may vary within wide limits. In Fig. 4 the angularity of surface 32 is 18 degrees while in Fig. 1 the angularity of surface 11 is 44 degrees. The range of angularities should not be less than approximately 15 degrees or greater than approximately 75 degrees except under special conditions and angularities between 30 degrees and 60 degrees are preferred for most conditions and applications.

Having thus described several embodiments of the present invention so that those skilled in the art may be able to understand and practice the present invention, I state that what I desire to secure by Letters Patent is defined in what is claimed.

What is claimed is:

1. A fluid seal comprising a body having an opening and a rigid projection having a substantially cylindrical surface surrounding said opening, a member aligned with said opening and having an outer conical surface disposed within said cylindrical surface, an annular, wedge-shaped, sealing ring having an inner surface inclined at an angle of approximately 2° to said conical surface, said ring making circumferential fluid sealing contact near its thinner end in substantially the same transverse plane with said cylindrical and conical surfaces, the contact of said ring with the said conical surface being substantially only a line contact when fluid pressure in the body is low and increasing in width as fluid pressure in the body increases, and means secured to the body for maintaining said ring in said sealing contact with said member and body.

2. A fluid seal comprising a body having an opening, an annular abutment surface surrounding said opening, and a rigid projection having a cylindrical surface surrounding said abutment surface, a pipe aligned with said opening, having an inner surface supported on said abutment surface and having an outer conical surface disposed within said cylindrical surface, an annular wedge-shaped sealing ring having an inner surface inclined at an angle of approximately 2° to said conical surface, said ring making circumferential fluid sealing contact near its thinner end in substantially the same transverse plane with said cylindrical and conical surfaces, the contact of said ring with the said conical surface being substantially only a line contact when fluid pressure in the pipe is low and increasing in width as fluid pressure in the pipe increases, and means secured to the body for maintaining said ring in said sealing contact with said pipe and body.

3. A fluid seal comprising a body having an opening, a conical abutment surface surrounding said opening, and a rigid projection having a cylindrical surface surrounding said abutment surface, a pipe aligned with said opening having an inner conical surface making circumferential sealing contact with said abutment surface, and having an outer conical surface disposed within said cylindrical surface, an annular, wedge-shaped, sealing ring having an inner surface inclined at an angle of approximately 2° to said outer conical surface, said ring making circumferential, fluid sealing contact near its thinner end in substantially the same transverse plane with said cylindrical and conical surfaces, the contact of said ring with the said conical surface being substantially only a line contact when fluid pressure in the pipe is low and increasing in width as fluid pressure in the pipe increases, and means secured to the body for maintaining said ring in said sealing contact with said pipe and body.

4. A fluid seal comprising a body having an opening and a rigid projection having a substantially cylindrical surface surrounding said opening, a member aligned with said opening and having an outer conical surface disposed within said cylindrical surface, an annular, wedge-shaped, sealing ring having an inner surface inclined at an angle of approximately 2° to said conical surface, said ring making circumferential fluid sealing contact near its thinner end in substantially the same transverse plane with said cylindrical and conical surfaces, the contact of said ring with the said conical surface being substantially only a line contact when fluid pressure in the body is low and increasing in width as fluid pressure in the body increases, deformable packing between said cylindrical and conical surfaces at the thicker end of said ring, and means secured to the body for pressing said packing against said ring and deforming the packing into sealing contact with said cylindrical and conical surfaces and for maintaining said ring in said sealing contact with said member and body.

5. A fluid seal comprising a unitary body having a recess defined in part by a substantially cylindrical surface and by a second surface disposed at an angle thereto, a member extending into said recess and having an outer conical surface opposed to said cylindrical surface, said body and member partly defining a chamber for fluid under pressure, an annular wedge-shaped sealing ring in the recess about said member, said ring having an outer surface making an outer, circumferential sealing contact with said cylindrical surface and having a conical inner surface inclined at a small angle to the outer conical surface of said member and making an inner, circumferential, fluid sealing contact near its thinner end with said outer conical surface, said inner contact being substantially only a line contact when fluid pressure in the body is low and increasing in width as the fluid pressure increases, and means connected to the body for maintaining the ring in said sealing contact with said member and said body.

JAMES C. HOBBS.

REFERENCES CITED

The following references are of record in the file of this patent:

UNITED STATES PATENTS

| Number | Name | Date |
| --- | --- | --- |
| 1,790,025 | Schnaier | Jan. 27, 1931 |
| 2,112,239 | Guarnaschelli | Mar. 29, 1938 |
| 2,247,031 | Norton | June 24, 1941 |

FOREIGN PATENTS

| Number | Country | Date |
| --- | --- | --- |
| 525,241 | Great Britain | Aug. 23, 1940 |